United States Patent Office 2,740,765
Patented Apr. 3, 1956

2,740,765

QUATERNARY AMMONIUM COMPOUNDS AS ACCELERATORS OF POLYMERIZATION OF ETHYLENIC COMPOUNDS

Earl E. Parker, Milwaukee, Wis., assignor to Pittsburgh Plate Glass Company, Allegheny County, Pa., a corporation of Pennsylvania No Drawing. Application October 15, 1953,
Serial No. 386,387

8 Claims. (Cl. 260—45.4)

This invention relates to the curing of interpolymerizable mixtures of (A) a polyester of a dicarboxylic acid containing a C=C—C=O group and a polyhydric alcohol and (B) a monomer containing a >C=CH₂ group preferably attached to a negative radical such as the following:

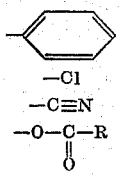

—Cl
—C≡N
—O—C—R
     ‖
     O and others.

The invention has especial relation to a novel catalyzation system designed to effect smooth and rapid cure of interpolymerizable mixtures of the foregoing polyesters and monomers.

It has heretofore been recognized that liquid monomers containing the >C=CH₂ group attached to a negative radical, as above described, were adapted when heated, to undergo addition polymerization to form valuable resins. It has also been recognized that polyesters of dihydric alcohols and alpha-beta ethylenic dicarboxylic acids were capable of addition reactions to form resinous products. Both of these reactions were relatively slow, so long as the esters or monomers per se were employed. This was true even though free radical initiators such as benzoyl peroxide or the like were incorporated for purposes of accelerating the reaction involved in polymerization.

It has further been recognized that mixtures of the fusible polyesters above described and the monomers soluble therein, were capable of far more rapid reaction than either of the components taken singly. For example, mixtures of (A) polyesters of glycols such as diethylene glycol and fumaric acid with (B) monomers such as styrene, readily undergo interpolymerization reactions to form infusible, insoluble (thermoset) addition products even at moderate temperatures and in the absence of substantial pressure. These interpolymerizable mixtures lend themselves quite effectively to the formation of castings and can be employed to coat or to impregnate preforms and fabrics of fibrous reenforcing materials such as glass fibers, asbestos and many other materials.

Indeed, the interpolymerizable mixtures are highly reactive and form polymer products so rapidly that the mixtures cannot be stored for any appreciable period of time without a strong tendency for them to undergo premature gelation and setting. This is especially true where the mixtures are subjected to somewhat elevated temperatures. Since mixing of the polyester and the monomer is often conducted with the polyester heated to impart fluidity thereto, there is danger of gelation even while the monomer is being mixed into the polyester.

In order to obviate these difficulties, it was early proposed to incorporate into the components of the interpolymerizable mixture substances termed inhibitors, which exhibited a strong tendency to retard or hold back the interpolymerization reaction, especially at moderate temperatures involved in the preparation of the mixtures, or in the storage of the latter after preparation. Among the materials so proposed for use as gelation inhibitors were the quinones and hydroquinones; also, catechols and substituted catechols such as tertiary-butyl catechol were often used. These quinonic or phenolic type of inhibitors were persistent and powerful inhibitors; in fact, they continued to exert a very strong retarding effect on interpolymerization even after the free radical initiators such as cumene hydroperoxide, or tertiary-butyl hydroperoxide were incorporated, and until the temperature of the polymerizable mixture was raised to a relatively high level. These persistent retarding effects were often highly undesirable, especially in the use of the interpolymerizable mixtures in casting operations. In mixtures containing these inhibitors alone, exothermal temperature was often excessive and cracked or discolored products resulted.

In a prior patent, U. S. 2,593,787 to Earl E. Parker, it has been disclosed that certain salts of quaternary ammonium compounds also constitute valuable gelation inhibitors in interpolymerizable mixtures of (A) polyesters of alpha-beta ethylenic dicarboxylic acids and polyhydric alcohols and (B) monomers containing a >C=CH₂ group.

These quaternary ammonium salts when incorporated into the monomer-polyester mixtures were highly effective over a relatively broad range of temperatures, so long as free radical initiator type catalysts such as benzoyl peroxide were not included in the mixture. However, when the latter were incorporated, the interpolymerizable mixtures would quickly start to polymerize and thus to gel and set into their hardened, infusible, insoluble or thermoset state. This reaction began at a relatively low temperature and proceeded smoothly and without excessive rise of the temperature due to exothermal heat production in the reaction. These characteristics in the quaternary ammonium salts were highly desirable especially in the art of casting the interpolymerizable mixtures. For this reason, they have enjoyed extensive use.

The foregoing patent to Earl E. Parker further discloses the use of quinones and hydroquinones with the quaternary ammonium salts for gelation inhibiting purposes, but the amount was no more than a trace. In the use of the foregoing mixtures of quinones and hydroquinones and quaternary ammonium salts as gelation inhibitors in the interpolymerizable mixtures the quaternary ammonium salt was employed in a greatly predominating amount and was relied upon to maintain storage life of the mixture.

The highly surprising discovery has now been made that in interpolymerizable mixtures of (A) polyesters of dihydric alcohols and alpha-beta ethylenic dicarboxylic acids and (B) monomers containing a >C=CH₂ group, which mixture has been stabilized with a quinonic or phenolic stabilizer and therefore tends to gel but slowly when heated in the presence of peroxide or hydroperoxide catalysts; the quaternary ammonium salts act as powerful activators or synergists or adjuvants, to attain gelation, often in a fraction of the time required in their absence. At the same time, the so-called "tank life" or capacity of the mixtures to withstand storage after the free radical initiator is added is satisfactory. It is a further important advantage of the invention that the gel times of mixtures of polyesters and monomers containing proper amounts of a phenolic stabilizer and quaternary ammonium salts, exhibit but slight tendency to drift during relatively long periods of storage.

It is to be recognized that both the quinonic or the phenolic inhibitors as well as the quaternary ammonium salts, exert their influence as stabilizers during the periods of storage of the interpolymerizable mixtures. Naturally, there is no synergistic, or activating effect until a free radical initiator such as a peroxide or hydroperoxide is added. For these reasons, the quaternary ammonium compound may be added concurrently with or subsequent to the addition of the peroxide.

It will be appreciated that where interpolymerizable mixtures are made up with but minimal amount of an inhibitor or an inhibitor pair, as herein disclosed, the inhibitor may tend to become depleted after a period of storage. In order to attain a longer tank life and a quick gel time in such mixture, appropriate amounts of the inhibitors (quinonic or phenolic and quaternary ammonium salt) may be added to the mixture at, or at about the time the peroxidic catalyst or free radical initiator is added.

The several components and the range of equivalents thereof in the interpolymerizable mixtures which may be treated in accordance with this invention, will now be more extensively elaborated upon:

The interpolymerizable component (polyesters and monomers) which may be employed, may be any of these discussed in the foregoing Parker patent and the latter may be employed as a source for the determination of appropriate interpolymerizable mixtures. Needless to say, any of the equivalents (many of which are well known) of the materials disclosed in the patent may also be employed, since they all depend upon a recognized mode of interaction between the ethylenic groups of the polyester and the corresponding terminal $>C=CH_2$ groups in the monomers.

In preparing polyesters which may be employed in the practice of the present invention, the polyhydric alcohol component may comprise ethylene glycol, diethylene glycol or propylene glycol. It is also sometimes advantageous to substitute for some of these glycols a polyethylene glycol such as the commercial "Carbowaxes."

Polyethylene glycols such as the "Carbowaxes" are understood to have molecular weights above 300. Those most useful for this invention have weights below 4000 and preferably are in a range of about 1000 to 2000, e. g., 1500.

The polycarbolylic acid components should comprise an alpha-beta ethylenic polycarboxylic acid such as maleic, fumaric or itaconic acid or the well-known derivatives of these polycarboxylic acids having ethylenic unsaturation in alpha-beta relation to a carboxyl. Polybasic acids such as aconitic acid, tricarballylic acid or citric acid may also be employed. A plurality of acids ethylenically unsaturated in the alpha-beta position may be mixed with each other, if so desired. In many instances, it is desirable also to include a dicarboxylic acid free of ethylenic unsaturation. This latter type of dicarboxylic acid includes phthalic acid or terephthalic acid, which although they contain double bonds in the benzene ring, do not undergo addition reaction with monomer compounds and may, therefore, be considered as being the equivalent of saturated compounds. Likewise, aliphatic dicarboxylic acids such as succinic acid, adipic acid, sebacic acid, or azelaic acid may be substituted for a part of the alpha-beta ethylenically unsaturated dicarboxylic acid. The proportion of the non-ethylenic acid with respect to the alpha-beta ethylenic component is susceptible of wide variation. A molecular proportion of 0.25 to 10 or 12 moles of the non-ethylenic component is suggested as being an appropriate range.

In preparing the polyester a small excess (usually 5 or 10 per cent) of the dihydric alcohol is usually employed. The conditions of esterification reaction are those conventionally employed in preparing polyesters. For example, the mixture of the polyhydric alcohol and the dibasic acid or acids is heated in a closed container or under an inert atmosphere until water of reaction is expelled from the system, which usually occurs in a temperature range of about 150 to 200° C. The reaction is continued until water ceases to evolve or until the acid value is reduced to a reasonably low point, e. g., within a range of about 5 to 50 or until the mixture becomes highly viscous or even solid when it is cooled. Usually these conditions are attained in a period of 2 to 20 hours. In any event, the reaction is concluded before the product becomes infusible and insoluble because of the advanced stage of polymerization.

The monomers may conveniently be selected from those listed in the foregoing patent or they may be selected from the following general list:

(1) Monoolefinic hydrocarbons, that is, monomers containing only atoms of hydrogen and carbon, such as styrene, alpha-methyl styrene, alpha-ethyl styrene, alpha-butyl styrene and vinyl toluene, and the like;

(2) Halogenated monoolefinic hydrocarbons, that is, monomers containing carbon, hydrogen and one or more halogen atoms such as alpha-chlorostyrene, alpha-bromostyrene, 2,5-dichlorostyrene, 2,5-dibromostyrene, 3,4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, chloroethylene (vinyl chloride), 1,1-dichloroethylene (vinylidene chloride), bromoethylene, fluoroethylene, iodoethylene, 1,1-dibromoethylene, 1,1-difluoroethylene, 1,1-diiodethylene, and the like;

(3) Esters of organic and inorganic acids such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate and ethyl tiglate, methyl acrylate, ethyl acrylate, propyl acrylate, isopropyl acrylate, butyl acrylate, isobutyl acrylate, amyl acrylate, hexyl acrylate, 2-ethyl-hexyl acrylate, heptyl acrylate, octyl acrylate, 3,5,5-trimethylhexyl acrylate, decyl acrylate and dodecyl acrylate, isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chlorocarbonate, allyl formate, allyl acetate, allyl propionate, allyl butyrate, allyl valerate, allyl caproate, diallyl phthalate, diallyl succinate, diethylene glycol bis-(allyl-carbonate), allyl 3,5,5-trimethylhexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, diallyl-3,4,5,6,7,7-hexachloro$\Delta^4$endomethylene tetrahydrophthalate, as well as methallyl esters corresponding to the above allyl esters, as well as esters from such alkenyl alcohols as beta-ethyl allyl alcohol, beta-propyl allyl alcohol, 1-buten-4-ol, 2-methyl-buten-1-ol-4, 2(2,2-dimethylpropyl)-1-buten-4-ol and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;

Dimethyl maleate, diethyl maleate, diallyl maleate, dimethyl fumarate, dimethallyl fumarate and diethyl glutaconate;

(4) Organic nitriles such as acrylonitrile, methacrylonitrile, ethacrylonitrile, crotonitrile, and the like;

(5) Acid monomers such as acrylic acid, methacrylic acid, crotonic acid, 3-butenoic acid, angelic acid, tiglic acid and the like;

(6) Amides such as acrylamide, alpha-methyl acrylamide, N-phenyl acrylamide, N-methyl, N-phenyl acrylamide, and the like.

The preferred monomers are liquid compounds soluble in the polyester component. They will contain the >C=CH₂ group and preferably the latter will be attached to a negative radical such as a benzene ring, a chlorine atom, an ester linkage, a nitrile group or the like. They should be free of carbon-carbon conjugated double bonds.

The monomer component, or components may be employed over a relatively broad range, but usually, the proportion thereof upon a weight basis will be less than the polyester component. Usually, the percentage of monomer will fall within a range of about 10 to 45 or 50 per cent by weight of the total mixture of polyester and monomer. The preferred range of monomer is about 20 to 40 per cent, in most instances.

Since the polyester component of the interpolymerizable mixture is often highly viscous or even solid at atmospheric temperatures, it is preferred to add the monomer thereto at a temperature sufficient to render the polyester satisfactorily fluid for incorporation with the monomer. This temperature usually is in a range of about 100° to 120° C. and is sufficiently high, in the absence of gelation inhibitors, quickly to induce premature gelation upon introduction of the monomer into the system. This is true even in the absence of free radical initiators. Accordingly, it is preferred to include a gelation inhibitor which is quinone or a dihydric phenol to one or both components of the mixture. Appropriate inhibitors of the quinonic or phenolic class include:

TABLE A p-Benzoquinone
Chloranil
Hydroquinone
4-t-butyl catechol
3-methyl catechol
4-ethyl catechol
4-isopropyl catechol These are but examples. Other phenolic inhibitors may be used in their place. For example, 3-isopropyl catechol which, within itself, is an excellent inhibitor may be employed.

Naturally, the gelation inhibitor remains in the solution of polyester and interpolymerizable monomer and may conveniently constitute an inhibitor of gelation during subsequent storage of the material before the latter is actually used. The amount of the phenolic inhibitor required in the mixture during the mixing stage is susceptible of variation but conveniently is in a range of about 0.01 to 0.1 per cent by weight based upon the polyester component of the mixture. It preferably should equal at least 10 per cent by weight of the quaternary ammonium salt and may be as much as 1000 or more per cent higher than the latter.

The interpolymerizable mixtures of polyesters of alpha-beta ethylenic dicarboxylic acids and monomers containing an inhibitor as above described, may be stored over substantial periods of time, for example, several weeks or even months without danger of premature gelation.

When the interpolymerizable mixture is to be employed in the preparation of castings, or laminates, or other bodies in accordance with the provisions of the present invention, a free radical initiator which is activated by the quaternary ammonium salt is added. Usually these are of the peroxidic type and may be either a peroxide or a hydroperoxide. Appropriate free radical initiators include:

Benzoyl peroxide
Tertiary butyl hydroperoxide
Cyclohexyl hydroperoxide
Acetyl peroxide
Lauroyl peroxide
Cumene hydroperoxide, etc.

These may be utilized in amounts of about 0.1 to 5 per cent by weight based upon the mixture. Naturally, the amount of the peroxygen catalyst applicable in the practice of the invention will vary with the activity of the particular salt and with the amount of quinone type or phenolic type inhibitor present in the interpolymerizable mixture. They all constitute catalysts of interpolymerization at elevated temperatures and are desirable in order to attain a complete and thorough cure in the mixtures within reasonable periods of time and at reasonable temperatures.

It is an advantage of the present invention that where a quaternary ammonium salt is employed in accordance with the provisions of the present invention as an adjuvant for the interpolymerization reaction even relatively mild catalysts such as cumene hydroperoxide may be successfully employed to attain a high rate of interpolymerization. Cumene hydroperoxide is usually considered to be a relatively slow catalyst though it is comparatively inexpensive. Therefore, it is highly desirable to obtain activation thereof by the use of the quaternary ammonium salt. The amount of the quaternary ammonium compound will vary usually within a range of about 0.001 to 0.1 per cent based upon the polyester component of the interpolymerizable mixture. If a reasonable excess of the quaternary ammonium salt is present in the interpolymerizable mixture above that required to produce maximum activating or synergistic effect no particular harm is done. Therefore, within reason, the upper limit of quaternary amonium salt is not critical.

It is to be understood that the quaternary ammonium salts employed as adjuvants or synergists with peroxides or hydroperoxide in the interpolymerization of stabilized mixtures in accordance with the provisions of the present invention, may be of a wide variety of chemical constituencies. It is desirable that the quaternary ammonium salts have a reasonable degree of solubility in the interpolymerizable mixture. Some of the quaternary ammonium salts are directly soluble in the polyester or mixtures of the polyester and monomers. Often it is desirable to provide what in effect constitutes a master batch of interpolymerizable mixture and a high concentration of quaternary ammonium salt. Such master batch can be obtained by addition of an excess of quaternary ammonium salt to the molten polyester and then adding the monomer. Small portions of this master batch can subsequently be added to the main batch of polyester and monomer containing a quinone or phenolic inhibitor in substantial amount. In some instances, quaternary ammonium salts are soluble in monomers such as styrene and solutions thereof in the latter can be added to the interpolymerizable mixture. In still other instances, the quaternary ammonium salt can be dissolved in a common solvent such as chloroform which is not a reactive component of the desired resin, and the solution can be added to the polyester, the monomer, or the mixture of the two.

Appropriate quaternary ammonium compounds can readily be selected by reference to the foregoing Patent 2,593,787 and especially by reference to Table G of the patent. Useful quaternary amonium salts include the following:

TABLE B

Trimethyl benzyl ammonium acetate
Trimethyl benzyl ammonium chloride
Trimethyl benzyl ammonium bromide
Triethyl benzyl ammonium chloride
Tripropyl benzyl ammonium chloride
Tributyl benzyl ammonium chloride
Cetyl trimethyl ammonium chloride
Octadecyl trimethyl ammonium chloride
Trimethyl benzyl ammonium chloride
Lauroyl pyridinium chloride
Phenyl trimethyl ammonium chloride
Tolyl trimethyl ammonium chloride
Benzyl trimethyl ammonium phosphate
Benzyl trimethyl ammonium iodide
Ethyl pyridinium chloride
Phenyl trimethyl ammonium chloride
Octyl trimethyl ammonium bromide
Ethylene bis(pyridinium chloride)
Ethylene bis(trimethyl ammonium bromide)
Trimethyl benzyl amonium oxalate
Trimethyl benzyl ammonium maleate
Trimethyl benzyl ammonium tartrate
Trimethyl benzyl ammonium lacetate
Trimethyl alkylbenzyl ammonium chloride
Diisobutyl phenoxy ethoxy ethyl dimethyl benzyl ammonium chloride The acids from which the salts are derived should be at least as strong as acetic acid and should be non-oxidizing. The salts should be soluble in the mixture. As demonstrated in the examples to follow, other quaternary ammonium salts than those indicated in Table B may be used as synergists, activators, or accelerators in the interpolymerizable mixture.

The application of the principles of the invention is illustrated by the following examples:

Example I

This example constitutes a control illustrating the gelation of an interpolymerizable mixture of an alpha-beta ethylenically unsaturated ester and a monomer which has been stabilized with hydroquinone without the use of a quaternary ammonium salt as a gelation catalyst. In the example, a polyester which was obtained by condensation of equal moles of maleic acid and phthalic acid with a silight stoichiometric excess of propylene glycol was used. This was divided into several samples.

SAMPLE I

Six hundred and fifty parts by weight of this polyester was mixed with 350 parts by weight of styrene and the mixture was stabilized against premature gelation by the incorporation of 0.13 part by weight of hydroquinone.

SAMPLE II

A second sample was prepared of identical composition except that the hydroquinone was replaced by 0.195 part by weight of 4-t-butyl-catechol.

SAMPLE III

A third sample was prepared identical to the first except that the hydroquinone was replaced by 0.13 part by weight of chloranil.

All of these samples were quite stable against premature gelation and could be stored for long periods of time.

In order to determine their curing characteristics, a test portion of each of the foregoing compositions, was incorporated with a free radical initiator namely, tertiary-butyl hydroperoxide, as a catalyst and in an amount of 1 per cent by weight based upon the interpolymerizable mixture. Each of the portions was then placed in a test tube which was heated in a water bath at a temperature of 180° F. The time required for gelation after the samples had been placed in the bath was taken as the gel time. These gel times were as follows:

| | Seconds |
|---|---|
| Sample I | 2575 |
| Sample II | 2135 |
| Sample III | 1229 |

Example II

This example also constitutes a control test conducted on samples identical with those in Example I but with 1 per cent by weight of cumene hydroperoxide as the catalyst or free radical initiator. The test conditions were also a duplicate of the latter. The gel times in seconds for the three samples respectively were:

| | Seconds |
|---|---|
| Sample I | 1353 |
| Sample II | 1540 |
| Sample III | 835 |

The following examples illustrate the use of quaternary ammonium salts as synergists or activators in the interpolymerizable mixtures.

The samples were heated on a water bath at 180° F., at which temperature interpolymerization proceeds rapidly to provide solid resinous products showing the utility of the materials for making castings in molds. The gelling of the mixtures was an observable phenomenon, and the cure and the time thereof shows the rate of cure. Shortly after gelling, the mixtures were cured to a hard, thermoset, insoluble state; but could be baked at 90° to 150° or 200° C. further to harden them if desired.

Example III

In this example, a quaternary ammonium salt known commercially as Quaternary O was added to a set of samples prepared in accordance with the provisions of Example I. Quaternary O is understood to be represented by the formula

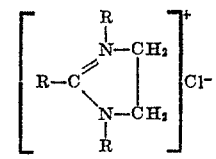

In the formula, radicals R are hydrogen or alkyl and the molecular weight thereof is to selected that the total molecular weight is about 450. In the samples of this example, the percentage of Quaternary O was varied, one sample containing 0.01 per cent of Quaternary O, the second containing 0.03 and the third containing 0.05 per cent by weight (these percentages of Quaternary O are based upon the total resin components). These samples were then introduced into a test tube as in the preceding examples and were subjected to the same curing conditions. The gel time in seconds of the samples containing 0.03 per cent by weight based upon the total resin of Quaternary O were respectively as follows:

Sample I _____ 846 (control 2575).
Sample II _____ 810 (control 2135).
Sample III _____ 596 (control 1229).

It is thus obvious that the gel time in seconds was cut by more than 50 per cent by the introduction of the Quaternary O. The cured products were hard, clear and crack free. The mixture could be used to make castings or to impregnate or coat preforms and fabrics.

Example IV

This is essentially a repetition of Example III except that the base compositions are taken from the composition of Example II and employ the cumene hydroperoxide catalyst of the latter example as the free radical initiator. With 0.01 per cent by weight based on the total resin of Quaternary O the gel times in seconds of the three base materials were respectively:

Sample I _____ 603 (control 1353).
Sample II _____ 690 (control 1543).
Sample III _____ 417 (control 835).

The products were clear, hard, sound castings.

Example V

In this example a quaternary ammonium compound known commercially as "Oronite Quaternary Compound ATM-50" was added to a stabilized and catalyzed composition as disclosed in Example I. The formula of "Oronite Quaternary Compound ATM-50" is understood to be:

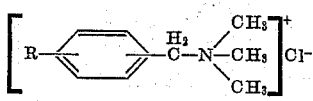

where R is an alkyl radical containing 8 to 18 carbon atoms. Tests were run respectively with quantities of 0.01, 0.03, and 0.05 per cent by weight based upon the total mixture of the quaternary ammonium compound. When the samples contained 0.01 per cent, the gel times in seconds were respectively:

```
                                                Seconds
Sample I _____ 454
Sample II _____ 486
Sample III _____ 338
```

The products were clear, sound castings.

Example VI

The stabilized and catalyzed composition prepared in accordance with the provisions of Example II were employed as a base resin and the "Oronite Quaternary Compound ATM-50" was employed as a synergist or adjuvant for the catalyst or free radical initiator. Tests again were run with 0.01, 0.03, and 0.05 per cent by weight based upon the total mixture of the quaternary ammonium compound. In the samples containing 0.03 per cent of the latter material, the gel times in seconds were respectively:

Sample I _____ 288
Sample II _____ 315
Sample III _____ 177

The products were clear, sound castings.

Example VII

In this example, a commercial quaternary ammonium compound designated as cetylbenzalkonium chloride was employed as a synergist or adjuvant in a stabilized and catalyzed composition prepared in accordance with Example I. It is understood that the cetylbenzalkonium chloride of this example include alkyl radicals of variable length substituted in or attached to the nitrogen atom. Tests were run respectively with 0.005, 0.01, 0.03, and 0.05 per cent of the quaternary ammonium compound and it was determined that the gel times were near a minimum with 0.03 per cent of the synergist. With this amount present, the gel times in seconds were respectively:

Sample I _____ 320
Sample II _____ 506
Sample III _____ 358

The products cured to provide clear, sound castings.

Example VIII

The synergist (cetylbenzalkonium chloride) of Example VII was employed in the inhibited mixture containing cumene hydroperoxide as prepared in accordance with Example II. Tests were run with sets of samples containing respectively 0.005, 0.01, 0.03, and 0.05 per cent of the quaternary ammonium compound and it was determined that the gel times were near a minimum with 0.01 per cent of the cetylbenzalkonium chloride. At this value the gel times in seconds were respectively:

Sample I _____ 320
Sample II _____ 343
Sample III _____ 169

The products were clear, sound castings. The mixture could be used to impregnate glass fabrics and other fibrous bodies.

Example IX

In this example, the stabilized compositions prepared in accordance with Example I containing tertiary-butyl hydroperoxide as a catalyst were activated in order to obtain a reduced gel time by the addition of lauroyl-pyridinium chloride. Tests were conducted respectively with 0.005, 0.01, 0.03, and 0.05 per cent by weight based upon the total resinifiable mixture of the lauroyl pyridinium chloride. With 0.01 per cent of the latter compound, the gel times in seconds were substantially at a minimum and are hereby tabulated as follows:

Sample I _____ 324
Sample II _____ 422
Sample III _____ 309

The castings were clear and sound.

Example X

This is a duplication of Example IX except that the cumene-hydroperoxide was employed as a free radical initiator in accordance with the disclosure of Example II. With 0.005 per cent by weight based upon the resinifiable mixture of the synergist, the gel times in seconds of the respective samples were:

Sample I _____ 314
Sample II _____ 310
Sample III _____ 189

Example XI

In this example the free radical initiator was tertiary butyl hydroperoxide (1 per cent). A commercial quaternary ammonium compound sold under the trade name of Hyamine 1622 was employed as a synergist. This is understood to be of the formula:

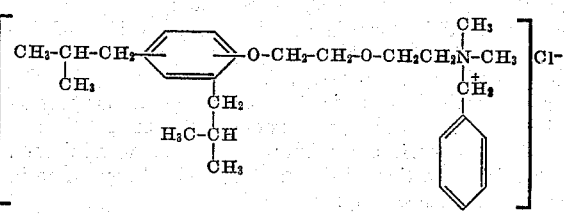

and is sold by the Rohm & Haas Company. Tests were conducted respectively with 0.005, 0.01, 0.03, and 0.05 per cent by weight of Hyamine 1622 based upon the total resins and optimum or near optimum results were obtained with 0.01 per cent of the same. At this concentration, the gel times in seconds for the three samples were respectively:

Sample I _____ 390
Sample II _____ 546
Sample III _____ 338

Example XII

This is a repetition of Example XI except that the commercial quaternary ammonium compound known as Hyamine 2389 was employed as the synergist. Hyamine 2389 is understood to be of the formula:

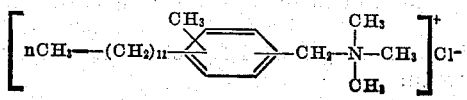

This compound is also sold by the Rohm & Haas Company. Tests were conducted respectively with 0.005, 0.01, 0.03, and 0.05 per cent by weight of the synergist and nearly optimum results were obtained with 0.01 per cent by weight thereof. At this concentration, the gel times in seconds were respectively:

Sample I _____ 328
Sample II _____ 352
Sample III _____ 303

Example XIII

This example is essentially a repetition of Example XII but with cumene hydroperoxide of Example II as the free radical initiator. With 0.01 per cent by weight based upon the mixture of Hyamine 1622 as disclosed in Example XI, the gel time in seconds of the samples were respectively:

Sample I _____ 326
Sample II _____ 312
Sample III _____ 173

Example XIV

This is a repetition of Example XIII with Hyamine 2389 as the synergist and the cumene hydroperoxide as the catalyst. With 0.01 per cent by weight of Hyamine 2389, the gel times in seconds of the samples were respectively:

Sample I _____ 335
Sample II _____ 338
Sample III _____ 194

Example XV

In this example a commercial quaternary ammonium compound, namely trimethyl benzyl ammonium chloride (disclosed in the forementioned Parker patent) was employed as a synergist. In the use of this synergist, 650 parts by weight of a polyester of equal moles of maleic anhydride and phthalic anhydride with propylene glycol in slight excess of stoichiometric proportion was employed. To this was added 350 parts by weight of styrene and 1 part by weight of trimethyl benzyl ammonium chloride. This mixture (designated as MB) was employed as a master batch for the introduction of trimethyl benzyl ammonium chloride into a stabilized and a catalyzed mixture prepared in accordance with the provisions of Example I. Master batch in amounts respectively of 2.5, 5, 7.5 and 10 per cent by weight based upon the total resins were employed in sets of samples. When 7.5 per cent by weight of the master batch was employed, the gel time of the interpolymerizable mixture was near a minimum. With this proportion of the master batch, the gel time in seconds was respectively:

Sample I _____ 202
Sample II _____ 319
Sample III _____ 225

Example XVI

This example is essentially a repetition of Example XV except that cumene hydroperoxide is replaced by tertiary-butyl hydroperoxide. In this example, minimum gel times were attained with about 10 per cent by weight of the master batch. With this proportion of master batch the gel times in seconds respectively were:

Sample I _____ 320
Sample II _____ 363
Sample III _____ 266

For purposes of more convenient comparison of the test data for the several examples, the essential features thereof are hereby presented for all of the examples in tabular form:

| Catalyst | Activator or Synergist | Gel Time in Seconds of Samples— | | |
|---|---|---|---|---|
| | | I | II | III |
| 1% t-butyl hydroperoxide. | | 2,575 | 2,135 | 1,229 |
| Do | 0.01% Quaternary O | 1,030 | 1,110 | 607 |
| Do | 0.03% Quaternary O | 846 | 810 | 596 |
| Do | 0.05% Quaternary O | 834 | 728 | 620 |
| Do | 0.005% Oronite Quaternary Compound ATM-50. | 562 | 844 | 208 |
| Do | 0.01% Oronite Quaternary Compound ATM-50. | 454 | 486 | 338 |
| Do | 0.03% Oronite Quaternary Compound ATM-50. | 487 | 484 | 331 |
| Do | 0.05% Oronite Quaternary Compound ATM-50. | 442 | 507 | 350 |
| Do | 0.005% Cetyl Benzalkonium Chloride. | 582 | 1,098 | 247 |
| Do | 0.01% Cetyl Benzalkonium Chloride. | 436 | 501 | 338 |
| Do | 0.03% Cetyl Benzalkonium Chloride. | 320 | 506 | 358 |
| Do | 0.05% Cetyl Benzalkonium Chloride. | 357 | 547 | 352 |
| Do | 0.005% Lauroyl Pyridinium Chloride. | 419 | 406 | 259 |
| Do | 0.01% Lauroyl Pyridinium Chloride. | 324 | 422 | 309 |
| Do | 0.03% Lauroyl Pyridinium Chloride. | 344 | 516 | 366 |
| Do | 0.05% Lauroyl Pyridinium Chloride. | | 593 | 357 |
| Do | 0.005% Hyamine 1622 | 537 | 760 | 272 |
| Do | 0.01% Hyamine 1622 | 390 | 546 | 338 |
| Do | 0.03% Hyamine 1622 | 382 | 548 | 323 |
| Do | 0.05% Hyamine 1622 | 406 | 403 | 384 |
| Do | 0.005% Hyamine 2389 | 424 | 922 | 287 |
| Do | 0.01% Hyamine 2389 | 378 | 390 | 312 |
| Do | 0.03% Hyamine 2389 | 328 | 352 | 303 |
| Do | 0.05% Hyamine 2389 | 335 | 376 | 306 |
| 1% Cumene Hydroperoxide. | | 1,353 | 1,543 | 835 |
| Do | 0.005% Quaternary O | 694 | 1,063 | 417 |
| Do | 0.01% Quaternary O | 603 | 690 | 417 |
| Do | 0.03% Quaternary O | 562 | 580 | 422 |
| Do | 0.05% Quaternary O | 575 | 588 | 427 |
| Do | 0.005% Oronite Quaternary Compound ATM-50. | 401 | 495 | 222 |
| Do | 0.01% Oronite Quaternary Compound ATM-50. | 338 | 370 | 170 |
| Do | 0.03% Oronite Quaternary Compound ATM-50. | 288 | 315 | 177 |
| Do | 0.05% Oronite Quaternary Compound ATM-50. | 312 | 325 | 175 |
| Do | 0.005% Cetyl Benzalkonium Chloride. | 412 | 490 | 185 |
| Do | 0.01% Cetyl Benzalkonium Chloride. | 320 | 343 | 169 |
| Do | 0.03% Cetyl Benzalkonium Chloride. | 335 | 327 | 195 |
| Do | 0.05% Cetyl Benzalkonium Chloride. | 316 | 314 | 190 |
| Do | 0.005% Lauroyl Pyridinium Chloride. | 314 | 310 | 189 |
| Do | 0.01% Lauroyl Pyridinium Chloride. | 284 | 302 | 183 |
| Do | 0.03% Lauroyl Pyridinium Chloride. | 320 | 313 | 198 |
| Do | 0.05% Lauroyl Pyridinium Chloride. | 336 | 326 | 237 |
| Do | 0.005% Hyamine 1622 | 389 | 350 | 176 |
| Do | 0.01% Hyamine 1622 | 326 | 312 | 173 |
| Do | 0.03% Hyamine 1622 | 319 | 322 | 199 |
| Do | 0.05% Hyamine 1622 | 348 | 337 | 220 |
| Do | 0.005% Hyamine 2389 | 431 | 492 | 201 |
| Do | 0.01% Hyamine 2389 | 335 | 338 | 194 |
| Do | 0.03% Hyamine 2389 | 310 | 300 | 205 |
| Do | 0.05% Hyamine 2389 | 315 | 310 | 189 |
| Do | 2.5% MB* | 420 | 698 | 256 |
| Do | 5.0% MB* | 345 | 352 | 229 |
| Do | 7.5% MB* | 202 | 319 | 225 |
| Do | 10.0% MB* | 276 | 308 | 218 |
| 1% t-butyl Hydroperoxide. | 2.5% MB* | 665 | 1,265 | 253 |
| Do | 5.0% MB* | 400 | 407 | 243 |
| Do | 7.5% MB* | 336 | 385 | 279 |
| Do | 10.0% MB* | 320 | 363 | 266 |

*Polyester master batch containing trimethyl benzyl ammonium chloride (see Example XV).

The amounts of free radical initiator and of inhibitor as well as the compounds employed in such capacities can be determined for each test recorded in the table by reference to Examples I and II.

Tank life, after the addition of the free radical initiators in Example III, as well as the subsequent examples, is quite substantial thus permitting batches of considerable size to be made up without danger of premature gelation before they can be used.

The mixtures prepared in accordance with the provisions of the preceding examples provide hard, clear resinous bodies in every way satisfactory in the casting art. The compositions containing the quaternary ammonium salts as adjuvants are characterized by their capacity to cure at relatively mild temperatures. Indeed, in the foregoing gel tests the products after the tests are essentially cured to their final state but if so desired they can be subjected to further heating, for example, at 90° to 150° C. for 10 minutes to 3 hours, or thereabouts, in order to attain maximum hardness.

The compositions formulated in accordance with the provisions of the examples, before they have been gelled, can also be spread on fabrics of glass or other materials or they can be employed to impregnate such fabric. They can then be baked to hard durable state. Likewise, they can be employed to impregnate or to coat preforms of fibrous materials which are subjected to heating and pressing in a mold to form molded articles in accordance with well known techniques. When the materials without further additions are heated to temperatures of 75° to 150° or 200° C. they set to their final hardened thermoset resinous state.

In the preceding examples, the propylene glycol component of the polyester may be replaced by other glycols such as diethylene glycol. Maleic acid in the polyester can also be replaced by fumaric acid or any of the other well known alpha-beta ethylenic polycarboxylic acids.

The styrene in the examples can be replaced by other monomers containing a terminal >C=CH₂ group attached to a negative radical and being represented by those disclosed in the aforementioned patent to Parker or in the preceding list of monomers herein contained.

The catalysts (tertiary-butyl hydroperoxide or cumene hydroperoxide, as given in the examples, may be replaced by any other suitable peroxide or hydroperoxide conventionally employed as a free radical initiator in compositions of the type herein disclosed and being represented in Table A.

The forms of the invention, as herein given, are to be considered as being by way of illustration and not by limitation. It will be apparent to those skilled in the art that numerous modifications may be made therein without departure from the spirit of the invention or the scope of the appended claims.

I claim:

1. A method of accelerating the polymerization of a mixture of (A) a polyester of a glycol and an alpha-beta ethylenically unsaturated dicarboxylic acid, and (B) a monomeric compound containing a $CH_2=C<$ group, said mixture containing as a gelation inhibitor at least about 0.01 per cent of a member of the class consisting of quinones and dihydric phenols, which comprises adding to said mixture at least about 0.001 per cent by weight of the polyester of a quaternary ammonium salt of a non-oxidizing acid at least as strong as acetic acid, in the presence of a peroxide polymerization catalyst.

2. The method of claim 1 wherein the gelation inhibitor selected from the class consisting of quinones and dihydric phenols is present in an amount of from about 0.01 per cent to 0.1 per cent by weight of the polyester component.

3. The method of claim 1 wherein the compound containing a $CH_2=C<$ group is styrene.

4. The method of claim 3 wherein the quaternary ammonium salt is trimethylbenzyl ammonium chloride.

5. The method of claim 3 wherein the quaternary ammonium salt is lauroyl pyridinium chloride.

6. A method of accelerating the polymerization of a mixture of (A) a polyester of a dihydric alcohol and a mixture of two dicarboxylic acids, one of which is alpha-beta ethylenically unsaturated, and another of which is free of ethylenic and acetylenic unsaturation, and (B) a monomeric compound containing a $CH_2=C<$ group, said mixture containing as a gelation inhibitor at least about 0.01 per cent by weight of the polyester of a member of the class consisting of quinones and dihydric phenols, which comprises adding to said mixture at least about 0.001 per cent by weight of the polyester of a quaternary ammonium salt of a non-oxidizing acid at least as strong as acetic acid, in the presence of a peroxide polymerization catalyst.

7. The method of claim 6 wherein the monomeric compound containing a $CH_2=C<$ group is styrene.

8. The method of claim 6 wherein the polyester component (A) is of propylene glycol, maleic acid and phthalic acid.

References Cited in the file of this patent

UNITED STATES PATENTS

| | | |
|---|---|---|
| 2,473,801 | Kropa | June 21, 1949 |
| 2,554,567 | Gerhart et al. | May 29, 1951 |
| 2,578,690 | Gerhart | Dec. 18, 1951 |
| 2,593,787 | Parker | Apr. 22, 1952 |
| 2,627,510 | Parker | Feb. 3, 1953 |